(12) United States Patent
Nochimowski

(10) Patent No.: US 7,970,983 B2
(45) Date of Patent: Jun. 28, 2011

(54) IDENTITY-BASED FLASH MANAGEMENT

(75) Inventor: Alain Nochimowski, Tel Aviv (IL)

(73) Assignee: SanDisk IL Ltd., Kfar Saba (IL)

( * ) Notice: Subject to any disclaimer, the term of this patent is extended or adjusted under 35 U.S.C. 154(b) by 767 days.

(21) Appl. No.: 11/872,014

(22) Filed: Oct. 14, 2007

(65) Prior Publication Data

US 2009/0100215 A1   Apr. 16, 2009

(51) Int. Cl.
*G06F 13/10* (2006.01)
(52) U.S. Cl. ............................................ 711/103; 710/8
(58) Field of Classification Search .................. 711/103, 711/154, 170; 710/8
See application file for complete search history.

(56) References Cited

U.S. PATENT DOCUMENTS

| | | | |
|---|---|---|---|
| 5,404,485 A | 4/1995 | Ban | |
| 5,937,425 A | 8/1999 | Ban | |
| 6,591,330 B2 | 7/2003 | Lasser | |
| 6,850,443 B2 | 2/2005 | Lofgren et al. | |
| 6,903,972 B2 | 6/2005 | Lasser et al. | |
| 7,346,344 B2 * | 3/2008 | Fontaine | 455/418 |
| 7,406,604 B2 * | 7/2008 | Berry et al. | 713/193 |
| 2003/0128568 A1 | 7/2003 | Nangle | |
| 2005/0024978 A1 | 2/2005 | Ronen | |
| 2005/0057973 A1 * | 3/2005 | Khatami et al. | 365/185.33 |
| 2006/0253645 A1 * | 11/2006 | Lasser | 711/103 |
| 2007/0124785 A1 * | 5/2007 | Marsico | 725/105 |
| 2007/0180186 A1 | 8/2007 | Cornwell et al. | |
| 2007/0180328 A1 * | 8/2007 | Cornwell et al. | 714/42 |
| 2008/0307155 A1 * | 12/2008 | Sinclair | 711/103 |

OTHER PUBLICATIONS

International Search Report and Written Opinion for PCT/IB2008/054101, dated Jun. 9, 2009, 14 pages.

* cited by examiner

*Primary Examiner* — Jared I Rutz
(74) *Attorney, Agent, or Firm* — Brinks Hofer Gilson & Lione

(57) ABSTRACT

Methods, apparatus, and computer code for effecting flash policy configuration operations in accordance with an end-user identifier and/or a host-instance identifier are disclosed herein. Exemplary flash policy configuration operations include (i) configuring a flash error-correction policy, (ii) configuring a flash-management table storage policy; (iii) configuring a wear-leveling policy; (iv) configuring a bad-block management policy and (v) configuring a flash-programming voltage parameter. Exemplary end-user identifiers include but are not limited to email account identifiers, logon user names, and International Mobile Subscriber Identities (IMSI). Exemplary host-instance identifiers may include but are not limited to International Mobile EQUIPMENT Identifiers (IMEI). Optionally, the flash policy configuration is contingent on authentication context data—for example, strength of the authentication (e.g. login/password vs. smart-card authentication or biometric authentication), date of the authentication, and identity provider information.

36 Claims, 12 Drawing Sheets

IDENTITY-BASED FLASH MANAGEMENT

FIELD OF THE INVENTION

The present invention relates to flash management techniques.

BACKGROUND AND RELATED ART

Flash Management Operations

Non-volatile memory is a type of memory that can retain its stored data without a power source. There are several types of non-volatile memories, with different read, write and erase capabilities, access times, data retention, data endurance cycles, etc. Electrically Erasable Programmable Read Only Memory (EEPROM) is capable of performing read write operations on a per-byte level, which means that each of the memory locations can be individually read and written.

Flash memory, comprised of flash-type floating-gate transistors, or cells, is a non-volatile memory similar in functionality and performance to EEPROM memory; flash memory has the advantage of being relatively inexpensive, although it operates under certain limitations. It is not possible to rewrite to a previously written location on flash memory without first erasing an entire memory section, i.e., the flash cells must be erased (e.g. programmed to "one") before they can be programmed again. Flash memory can only erase relatively large groups of cells, usually called erase blocks (for example, 16 KB to 256 KB in size for many current commercial devices). Therefore updating the contents of a single byte or even a chunk of 1 KB requires "housekeeping" operations—data stored in the erase blocks that are not updated must first be moved elsewhere (i.e. relocated) so that they will be preserved during the erase operation, and then moved back into place after the update.

Sometimes, some of the blocks of the flash memory device, called "bad blocks", are not reliable and their use should be avoided. Blocks are declared as "bad blocks" either by the manufacturer, when initially testing the device, or by application software, when detecting the failure of the blocks during operation of the memory device.

To overcome these limitations, a Flash File System (FFS) is implemented, as disclosed in U.S. Pat. No. 5,404,485 to Ban, incorporated by reference as if fully set forth herein. FFS provides a system of data storage and manipulation on flash devices that allows these devices to emulate magnetic disks. In the existing art, applications or operating systems interact with the flash storage subsystem using virtual addresses, rather than using physical addresses. There is an intermediary layer between the software application and the physical device that provides a mapping (also referred to herein as a "translation") from the virtual addresses into the physical addresses. While the application or operating system software may view the storage system as having a contiguous defect-free medium that can be read or written randomly with no limitations, the physical addressing scheme has "holes" in its address range (due to bad blocks, for example), and pieces of data that are adjacent to each other in the virtual address range might be greatly separated in the physical address range. The intermediary layer that does the mapping described above may, for example, be implemented in part or in whole by a software driver running on the same CPU on which the applications run. Alternatively or additionally, the intermediary layer may be in part or in whole embedded within a controller that controls the flash device and serves as the interface for the main CPU of the host computer when the host computer accesses the memory device (also called "storage device"). This is, for example, the situation in removable memory cards such as SecureDigital (SD) cards or MultimediaMemoryCards (MMCs), where the card has an on-board controller running a firmware program that, among other functions, implements the type of mapping described above.

Software or firmware implementations that perform such address mappings are usually called "flash management systems" or "flash file systems". The term "flash file system" actually is a misnomer, as the implementations do not necessarily support "files" in the sense that files are used in operating systems or personal computers, but rather support block device interfaces similar to those exported by hard disk software drivers. Still, the term is commonly used, and "flash file system" and "flash management system" are used herein interchangeably.

Other systems that implement virtual-to-physical address mapping are described in U.S. Pat. No. 5,937,425 to Ban and U.S. Pat. No. 6,591,330 to Lasser. Both of these patents are incorporated by reference for all purposes as if fully set forth herein.

For the present disclosure, a "flash management layer" is a computer element (i.e. implemented in hardware, software, firmware or any combination thereof—residing on any number of devices) that (i) receives requests to write data to flash or to read data from flash (for example, at a specified block); (ii) handles the requests by programming the flash or reading data from flash; and (iii) effects one or more auxiliary flash management operations (for example, housekeeping operations, address mapping, bad block management, wear-leveling, management of storage of "mapping tables" or other flash management tables, and error correction). Flash management layers are useful for "hiding" from a client at least some of the complexity of using flash memory—for example, the need to carry out housekeeping operations when writing to flash, the need to effect bad block management, the fact that data read from flash cells is sometimes unreliable and there is a need to effect some sort of error correction, the need to extend the life of the flash memory cells by wear leveling, and for the case of NAND—the need to operate under the constraint that NAND is not random access but serial access).

Examples of policies for storage of flash management tables are discussed in US 20060253645 incorporated by reference for all purposes as if fully set forth herein.

Examples of wear leveling techniques for flash EEPROM systems are discussed in U.S. Pat. No. 6,850,443 incorporated by reference for all purposes as if fully set forth herein.

Examples of techniques of managing programming voltage parameters for writing to flash memory or "programming flash memory cells" is provided by U.S. Pat. No. 6,903,972 and US 2005/0024978, incorporated by reference for all purposes as if fully set forth herein.

Some Exemplary Flash Storage Systems

FIG. 1A is a block diagram of an exemplary flash storage system 100A that includes both a file-system 130 layer, and a flash management layer 140 for directly reading from and/or writing to flash memory cells 150. "Client application" 106A (for example, an application executing on a personal computer (e.g. MS-Word® or on a cell-phone application (e.g. an address book application)) sends to the file-system 130 commands to store data to persistent memory and to read data from persistent memory according to a standard file-system syntax ("file open," "file read," "filed write," etc). These file system commands are received by file system 130 via "file system interface" 30 (i.e. a logical interface through which file system 130 receives commands according to file system syntax).

Upon receiving each aforementioned data storage request or data retrieval request via file system interface 30, file system 130 invokes data storage or data retrieval services provided by flash management layer 140 which "hides the complexity" of flash storage by presenting to the file system a block-oriented or page-oriented interface (for example, a Logical Block Addressing (LBA) interface) or other high-level interface such as interface 40. Thus, in the exemplary configuration shown in FIG. 1A, there is no need for file system 130, or for client application 106A, to be "aware" of the specifics of flash management.

In recent years, so-called "object-oriented" storage systems have become more popular. FIGS. 1B and 1C are block diagrams of exemplary object-oriented systems (shown at 100B and 100C, respectively) in which data is stored to, and/or retrieved from, flash. In the example of FIG. 1B, the client application 106B issues a request to store a data object or retrieve a data object using an object-oriented protocol such as Media Transfer Protocol (MTP) or Object-based Storage Device (OSD) protocol/command via object-oriented storage interface 20. Object mode-logical sector mode translation layer 124 (i.e. part of an 'object-oriented storage system') receives the request, and sends to flash management layer 140 corresponding read or write requests via the block-oriented interface (for example, an LBA interface) via flash management layer interface 40.

The example of FIG. 1C relates to a storage system that supports more "modern" object oriented storage protocols together with "legacy" file system architecture. Thus, in the example of FIG. 1C, the client application 106B issues a request to store a data object or retrieve a data object using an object-oriented protocol such as MTP or OSD via object-oriented storage interface 20. Object mode-file mode translation layer 126 receives the request, and sends, via file system interface 30, corresponding file-system read or write requests to the "legacy" file system 130.

SUMMARY

Methods, apparatus, and computer code for effecting flash policy configuration operations in accordance with an end-user identifier and/or a host-instance identifier are disclosed herein. Exemplary flash policy configuration operations include (i) configuring a flash error-correction policy, (ii) configuring a flash-management table storage policy; (iii) configuring a wear-leveling policy; (iv) configuring a bad-block management policy and (v) configuring a flash-programming voltage parameter. Exemplary end-user identifiers include but are not limited to email account identifiers, logon user names, and International Mobile Subscriber Identity (IMSI). Exemplary host-instance identifiers include but are not limited to International Mobile Equipment Identifiers (IMEI). Optionally, the flash policy configuration is contingent on authentication context data—for example, for example, strength of the authentication (e.g. login/password vs smartcard authentication or biometric authentication), date of the authentication, and identity provider information.

According to an embodiment of the present invention a system for configuring flash memory access behavior comprises: a) an interface for receiving at least one identifier selected from the group consisting of a host-instance identifier and an end-user identifier; and b) a flash policy enforcer operative to effect, in accordance with at least one received identifier selected from the aforementioned group, at least one flash configuration operation selected from the group consisting of: i) a configuration of a flash error-correction policy; ii) a configuration of a flash-management table storage policy; iii) a configuration of a wear-leveling policy; iv) a configuration of a bad-block -management policy; and v) a configuration of at least one flash-programming voltage parameter.

According to some embodiments, the flash policy enforcer is operative to effect the configuration of the flash error-correction policy.

According to some embodiments, the flash policy enforcer is operative to effect the configuration of the flash-management layer table storage policy.

According to some embodiments, the flash policy enforcer is operative to effect the configuration of the wear-leveling policy.

According to some embodiments, the flash policy enforcer is operative to effect the configuration of the bad-block-management policy.

According to some embodiments, the flash policy enforcer is operative to effect the configuration of at least one flash-programming parameter.

According to some embodiments, i) the interface is a multi-function interface that is further operative to receive at least one data-handling request selected from the group consisting of a data-read-request and a data-write-request; and ii) the flash policy enforcer is operative to effect the at least one flash configuration operation for servicing the data-handling request.

According to some embodiments, i) the interface is a file-system interface; and ii) the flash policy enforcer is operative to effect the at least one flash configuration operation by issuing a fle system—flash management layer directive. According to some embodiments, i) the interface is a flash management layer interface; ii) the flash policy enforcer is operative to effect the at least one flash configuration operation by issuing an intra-flash management layer directive.

According to some embodiments, the interface is an object-oriented storage interface.

According to some embodiments, the flash policy enforcer is operative to effect the at least one flash configuration operation by issuing an object translation layer—file system layer directive.

According to some embodiments, i) the interface is operative to receive the end-user identifier; and ii) the flash policy enforcer is operative to effect the at least one flash configuration operation in accordance with the received end-user identifier.

According to some embodiments, i) the interface is operative to receive the host-instance identifier; and ii) the flash policy enforcer is operative to effect the at least one flash configuration operation in accordance with the received host instance identifier.

According to some embodiments, i) the received end-user identifier is an email address; and ii) the flash policy enforcer is operative to effect the at least one flash configuration operation in accordance with the received email address.

According to some embodiments, i) the end-user identifier is a phone service subscriber identifier (for example, an International Mobile Subscriber Identity); and ii) the flash policy enforcer is operative to effect the at least one flash configuration operation in accordance with the received phone service subscriber identifier.

According to some embodiments, i) the host-instance identifier is a telephone handset unique identifier; and ii) the flash policy enforcer is operative to effect the at least one flash configuration operation in accordance with the received telephone handset unique identifier.

According to some embodiments, the system further comprises: c) an identifier-mapping database configured to store a plurality of the identifiers such that each identifier of the plurality is associated with a respective flash management parameter set including a respective at least one flash operation parameter selected from the group consisting of: i) an error-correction level for the flash error-correction policy; ii) a frequency parameter for saving at least flash management table from volatile memory to flash memory for the flash management table storage policy; iii) a wear-leveling parameter for determining at least one of: A) whether or not wear-leveling should be carried out; and B) how frequently to effect wear-leveling operations; iv) a bad-block threshold parameter; and v) a flash programming parameter; wherein the flash policy enforcer is operative to: (i) obtain from the identifier-mapping database, a respective the matching flash management parameter set corresponding to the interface-received identifier; (ii) effect the flash-configuration operation in accordance with at least one obtained flash parameter of the matching flash parameter management set.

According to some embodiments, the flash policy enforcer is operative to effect the at least one flash configuration operation in a manner that is contingent on authentication context data of the at least one identifier.

According to an embodiment of the present invention, a method for configuring flash memory access behavior comprises: a) receiving at least one identifier selected from the group consisting of a host-instance identifier and an end-user identifier; and b) effecting, in accordance with at least one received identifier selected from the group, at least one flash configuration operation selected from the group consisting of: i) configuring a flash error-correction policy; ii) configuring a flash-management table storage policy iii) configuring a wear-leveling policy; iv) configuring a bad-block-management policy; and v) configuring at least one flash-programming parameter.

According to some embodiments, the at least one flash configuration operation includes effecting the configuring of the flash error-correction policy in accordance with the received identifier.

According to some embodiments, the at least one flash configuration operation includes effecting the configuring of the flash-management table storage policy in accordance with the received identifier.

According to some embodiments, the at least one flash configuration operation includes effecting the configuring of the wear-leveling policy in accordance with the received identifier.

According to some embodiments, the at least one flash configuration operation includes effecting the configuration of the bad-block-management policy in accordance with the received identifier.

According to some embodiments, the at least one flash configuration operation includes effecting the configuration the at least one flash-programming parameter in accordance with the received identifier.

According to some embodiments, i) the identifier is received via a multi-function interface that is further operative to receive at least one data-handling request selected from the group consisting of a data-read-request and a data-write-request; and ii) the at least one flash configuration operation includes is operative to configure a servicing of the data-handling request.

According to some embodiments, i) the identifier is received via a file-system interface; ii) the at least one flash configuration operation includes issuing a file system—flash management layer directive.

According to some embodiments, i) the identifier is received via a flash management layer interface; and ii) the at least one flash configuration operation includes issuing an intra-flash management layer directive in accordance with the flash management layer interface received identifier.

According to some embodiments, the identifier is received via an object-oriented storage interface.

According to some embodiments, the at least one flash configuration operation includes issuing an object translation layer—file system layer directive.

According to some embodiments, i) the received identifier includes the end-user identifier; and ii) the at least one flash configuration operation is carried out in accordance with the received end-user identifier.

According to some embodiments, i) the received identifier includes the host instance identifier; and ii) the at least one flash configuration operation is carried out in accordance with the received host instance identifier.

According to some embodiments, i) the received end-user identifier is a phone service subscriber identifier (for example, an International Mobile Subscriber Identity); and ii) the at least one flash configuration operation is carried out in accordance with the received phone service subscriber identifier.

According to some embodiments, i) the host-instance identifier is a telephone handset unique identifier; and ii) the at least one flash configuration operation is carried out in accordance with the received telephone handset unique identifier.

According to some embodiments, the method further comprises the step of: c) obtaining a respective matching flash management parameter set corresponding to the interface-received identifier from an identifier-mapping database that stores a plurality of the identifiers such that each identifier of the plurality is associated with a respective flash management parameter set including a respective at least one flash operation parameter selected from the group consisting of: i) an error-correction level for the flash error-correction policy; ii) a frequency parameter for saving at least flash management table from volatile memory to flash memory for the flash management table storage policy; iii) a wear-leveling parameter for determining at least one of: A) whether or not wear-leveling should be carried out; B) how frequently to effect wear-leveling operations; iv) a bad-block threshold parameter; and v) a flash programming voltage parameter, wherein the flash configuration operation is effected in accordance with at least one obtained flash parameter of the matching flash parameter management set.

According to some embodiments, the at least one flash configuration operation is effected in a manner that is contingent on authentication context data of the at least one identifier.

According to some embodiments a computer readable medium comprises program instructions, wherein when executed the program instructions are operable to; a) receive at least one identifier selected from the group consisting of a host-instance identifier and an end-user identifier; and b) effect, in accordance with at least one received identifier selected from the aforementioned group, at least one flash configuration operation selected from the group consisting of; i) configuring a flash error-correction policy; ii) configuring a flash-management layer storage policy; iii) configuring a wear-leveling policy; iv) configuring a bad-block-management policy; and v) configuring at least one flash-programming parameter.

These and further embodiments will be apparent from the detailed description and examples that follow.

BRIEF DESCRIPTION OF THE DRAWINGS

While the invention is described herein by way of example for several embodiments and illustrative drawings, those skilled in the art will recognize that the invention is not limited to the embodiments or drawings described. It should be understood that the drawings and detailed description thereto are not intended to limit the invention to the particular form disclosed, but on the contrary, the invention is to cover all modifications, equivalents and alternatives falling within the spirit and scope of the present invention. As used throughout this application, the word "may" is used in a permissive sense (i.e., meaning "having the potential to"), rather than the mandatory sense (i.e. meaning "must").

DETAILED DESCRIPTION OF EMBODIMENTS

Figure 1A:
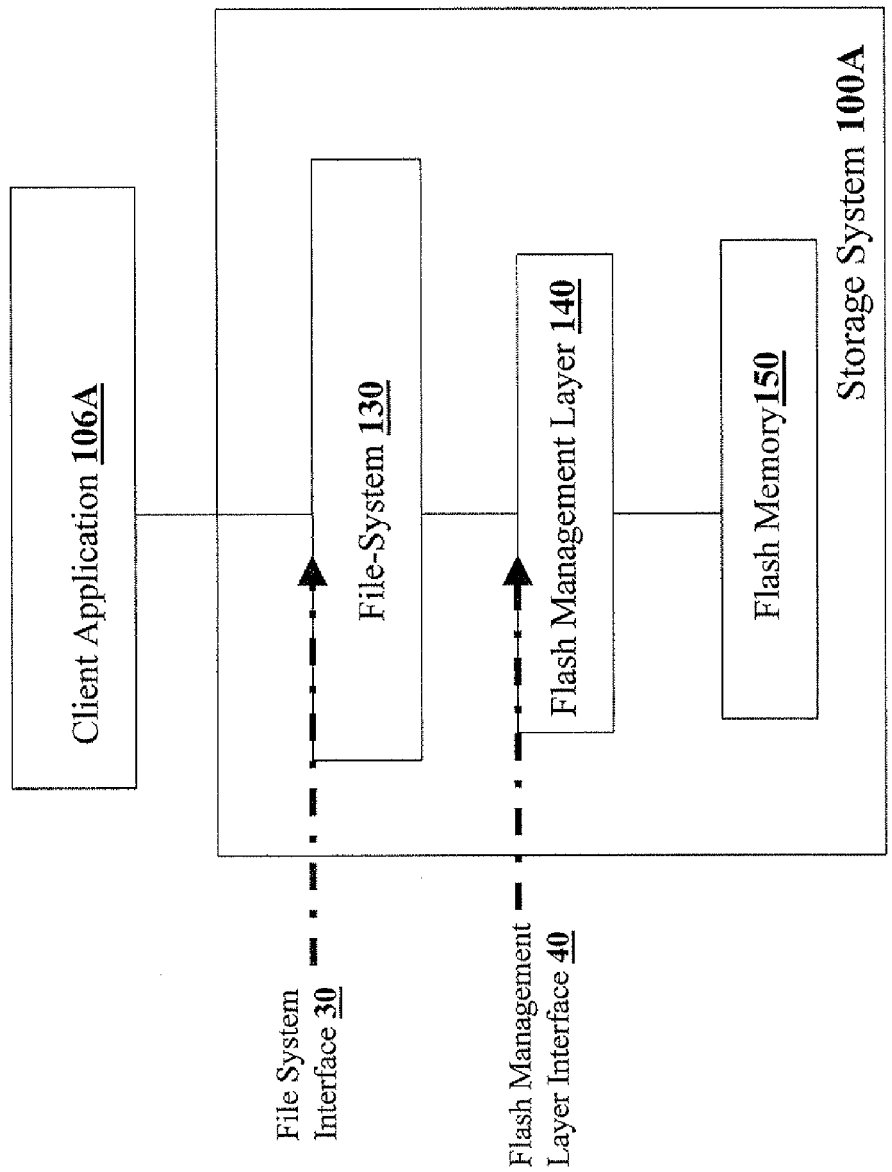
FIGS. 1A-1C (prior art) are block diagrams of exemplary flash storage systems.
Figure 1B:
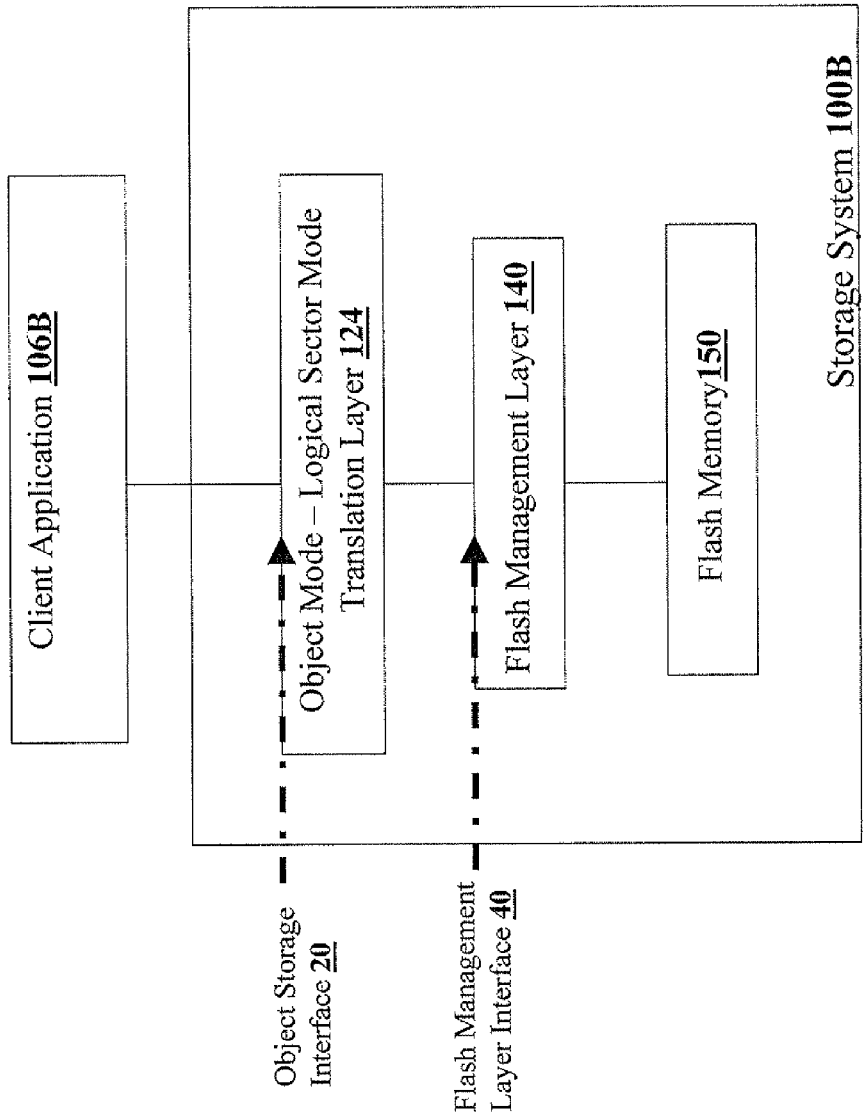
Figure 1C:
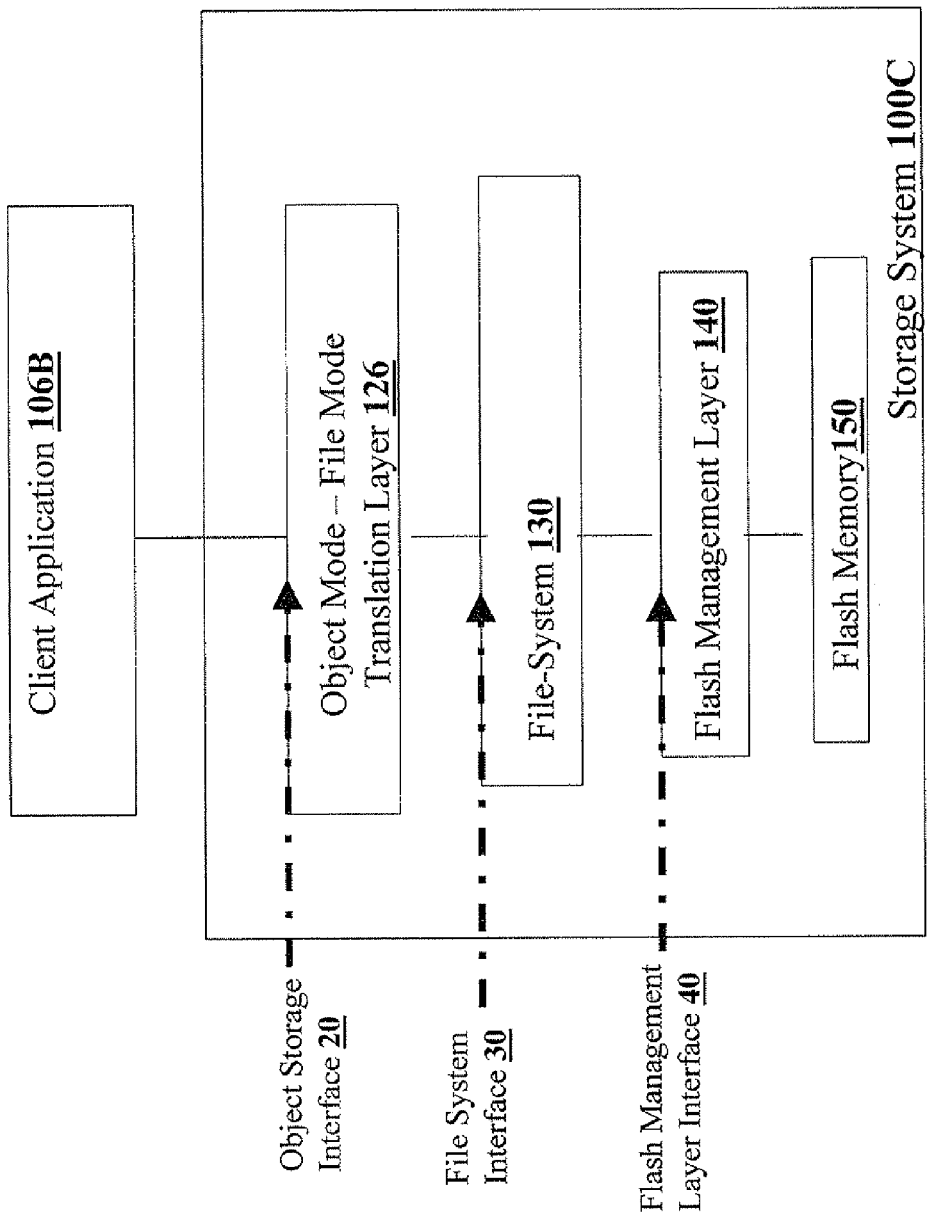

The present invention will now be described in terms of specific, example embodiments. It is to be understood that the invention is not limited to the example embodiments disclosed. It should also be understood that not every feature of the apparatus, methods and computer-code for providing identity-based flash management services described is necessary to implement the invention as claimed in any particular one of the appended claims. Various elements and features of devices are described to fully enable the invention. It should also be understood that throughout this disclosure, where a process or method is shown or described, the steps of the method may be performed in any order or simultaneously, unless it is clear from the context that one step depends on another being performed first.

The inventor of the present invention has found that it is possible to provide "ID-aware" flash management services; i.e., it is feasible and useful to enforce a flash management policy selected in accordance with an end user identifier and/or host-instance identifier.

A First Discussion of Various Use Cases

Several non-limiting exemplary use cases are now discussed.

In a first non-limiting example, a vendor or service-provider may prefer to enable a certain end-user (i.e. a "first" end-user) to read or write data 'quickly' (while sacrificing a certain amount of reliability or flash endurance) while providing to a different end-user (i.e. a "second" end-user) a higher level of 'reliability' (even at the cost of read or write speed or flash endurance).

Thus, when it is determined that the "first end-user" (or an application associated with the first end-user) is invoking flash services (i.e. writing data to flash or retrieving data from flash), a first set of "flash management parameters" may be used. For example, when handling requests associated with the first user, less wear leveling may be used (i.e. since including wear leveling operations may reduce the speed at which flash services are provided) or a lower level of error correction may be provided. In another example, when handling write requests associated with the first user, certain "flash voltage programming parameters" associated with "greater speed" may be selected (see, for example, U.S. Pat. No. 6,903,972)—for example, using larger pulse increments of the programming pulses, using a lower target threshold voltage, using wider programming voltage pulses, using higher starting programming voltages, using fewer programming voltage pulses and/or using lower maximum programming voltages.

On the other hand, when handling requests from the "second" end-user, a different policy may be enforced. For example, when handling requests associated with the second end user, more wear leveling may be used (i.e. to provide a greater flash endurance), or a higher level or error correction may be used (i.e. to provide a greater reliability or accuracy in flash-read data). In another example, when handling write requests associated with the second user, smaller programming pulse increments may be used (i.e. which allows the data to be written more reliably at the cost of a slower write operation).

In a second non-limiting example, a vendor or service provider may decide to provide a "third user" with 'improved' robustness against power failures (i.e. even at the expense of speed), while providing a "fourth user" with increased read and/or write speed (i.e. with possibly a reduced level of robustness against power failures). According to this example, when handling read or write requests the "third user," the flash management system will save flash management tables (for example, address translation tables) from RAM to flash very often—in the event of a power failure, it will be possible to recover from the power failure quicker and/or with greater data integrity than the case where flash management tables are saved from RAM to flash less often. On the other hand, when handling read or write request from the "fourth user," the frequency at which flash management tables are saved from RAM to flash would be reduced, in order not to slow the system with performance-slowing housekeeping operations. For the present disclosure, the frequency (for example, in time and/or in number of operations or any other frequency parameters) at which flash management tables are saved from RAM to flash is one example of a "flash-management table storage policy".

In a third non-limiting example, a vendor or service-provider may decide to provide a "fifth" end-user with higher level of data storage reliability, even if the total storage space of a given device is reduced, while for a "sixth" end-user, it may be decided by the vendor or service provider to sacrifice a certain amount of data storage reliability in order to be afforded a larger flash storage space. Thus, according to this third example, a bad-block-management policy may be selected and enforced in accordance with an end-user identifier and/or a host instance identifier (i.e. as discussed below).

According to the third non-limiting example, each block is associated with a respective probability of being a "bad-block," and a "bad-block-management policy" is enforced where, if the probability that a given block is a "bad block" exceeds a certain "probability threshold," the block is designated as a bad block and not used.

Thus, according to this third example, when handling read or write request from the "fifth" user, a relatively "high" value for this "bad block probability threshold" is enforced—a smaller total number of blocks are considered "good blocks" or "reliable blocks". This "higher standard" increases device reliability while sacrificing storage size. Conversely, when handling read or write request from the "sixth" user, a relatively "low" value for this "bad block probability threshold" is enforced—a larger total number of blocks are considered "good blocks" or "reliable blocks". This "higher standard" increases available storage size while potentially reducing device reliability.

A Discussion of End-User Identifiers and Host-Instance Identifiers

The present inventor is now disclosing an apparatus and technique for providing identify-based flash management services in accordance with one or more of: (i) an end-user identifier and (ii) a host-instance identifier.

For the present disclosure, the term "end-user" identifier refers to an identifier of a human user or to an end-user subscription or subscriber identifier or to a user account identifier. It is recognized that there are many situations where multiple human beings (for example, within a family or within an enterprise) share a single 'user identifier'—for example, the same email account, the same account on a single machine or local area network, or multiple users of the same cell phone account.

According to a first non-limiting example, a user logs into his MS-Windows® account with a "log-on name" and "password". In this example, the operating system (or a portion thereof) passes the "log-on name" to the computing element (i.e. implemented in software and/or hardware and/or firmware) responsible for enforcing the "identity-based flash management or flash storage" policy. In this example, the "log-on name" is the "end-user identifier" and this refers to the "user account" within MS-Windows®.

In another a second non-limiting example, an MS-Word application includes "User Information" (e.g. accessible by "Tools-Options-User Information"). According to this example, MS-Word® passes this "end-user identifier" data on to the operating system, which passes the "user information" data to the computing element (i.e. implemented in software and/or hardware and/or firmware) responsible for enforcing the "identity-based flash management or flash storage" policy.

Another example of an "end-user" identifier is an "email address".

Another example of an "end-user" identifier is a phone service subscriber identifier such as an International Mobile Subscriber Identity (IMSI).

A Discussion of Host-Instance Identifiers

Figure 2:
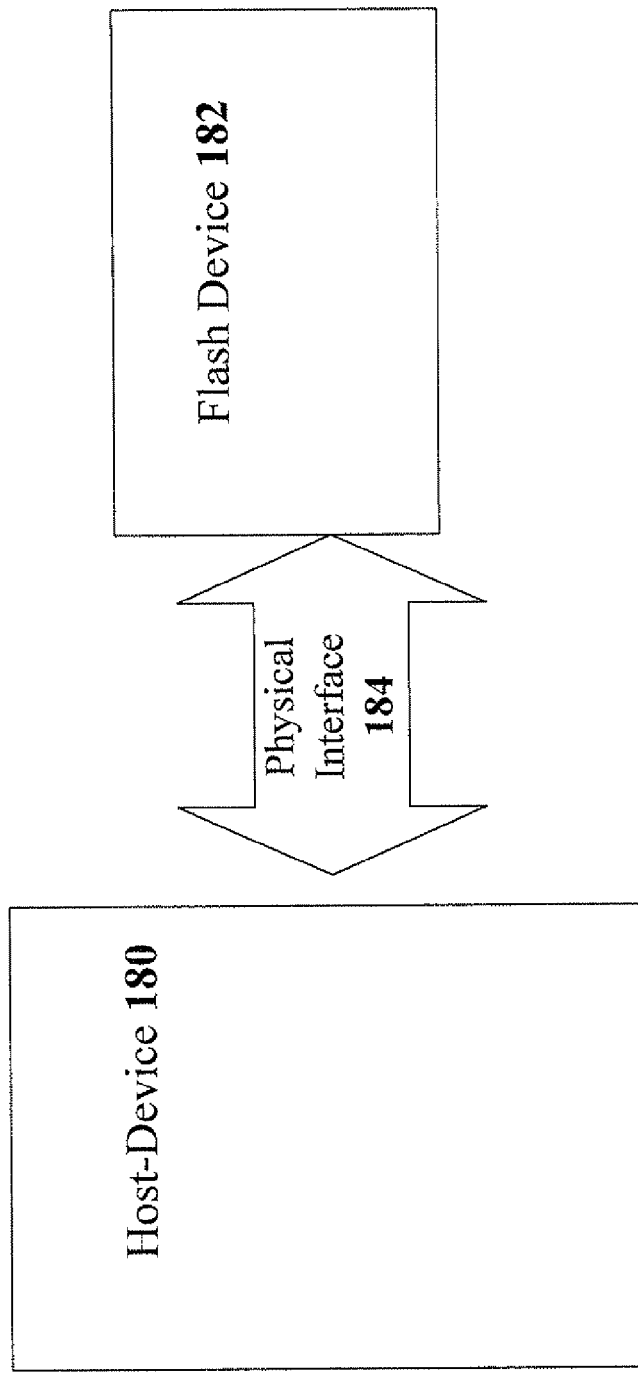
FIG. 2 is a block diagram of an exemplary host device coupled with a flash device.

With reference to FIG. 2, it is noted that in some embodiments, the "flash device" 182 and the "host device" 180 are physically separate devices (i.e. each associated with a different respective housing) operatively coupled together via some sort of wired or wireless physical interface (for example, a Universal Serial Bus (USB) interface, an MMC interface, an SD interface, etc.) According to this example, the host device 180 and the flash device 182 effect "inter-device communications" 184 using some asymmetric protocol with a "host-side" and a "device-side" (for example, a USB protocol).

Thus, in one non-limiting example, "host device" 180 is a personal computer and "flash device" 182 is a USB flash drive (or UFD). In another non-limiting example, "host device" 180 is a mobile phone and "flash device" 182 is a SIM card.

It is noted that, typically, manufacturers will associate each host device, such as host device 180, with a unique identifier that is independent of the computing capability of the host hardware. For example, a mobile phone manufacturer can manufacture a large number of identical phones, where each phone is associated with a different "hardware identifier" or "host-instance identifier".

One non-limiting example of a host-instance identifier is a "telephone handset unique identifier" such as the International Mobile Equipment Identifiers (IMEI) unique to every GSM and UMTS phone.

A Second Discussion of Various Use Cases

The present inventor is now disclosing that it is possible for flash device 182 to provide flash storage or management services in accordance with the "host-instance identifier" of host 180.

Thus, all of the use cases, which are discussed in the earlier section in terms of a "first end-user" and a "second end-user", etc., are also relevant in cases where it is desired to provide a first type of flash management services to a first host device having a "first host-instance identifier" and a second type of flash management services to a second host device having a "second host-instance identifier".

In one non-limiting example, the flash device 182 is pre-configured (for example, in the factory, or by a distributor, or in any other manner) with an on-board database of "host-instance identifiers" identifiers. At some point in time (for example, when a data-read or write operation is requested), the flash device 182 needs to determine the identity of the host device 180 to which flash device 182 is coupled, and to provide flash management or storage services accordingly. According to this non-limiting example, a look up of this on-board database may be effected (i.e. using the host-instance identifier), in order to retrieve (i.e. based upon the host-instance identifier) a description or identifier of the appropriate flash-management or flash-storage policy, which is then enforced.

Figure 3:
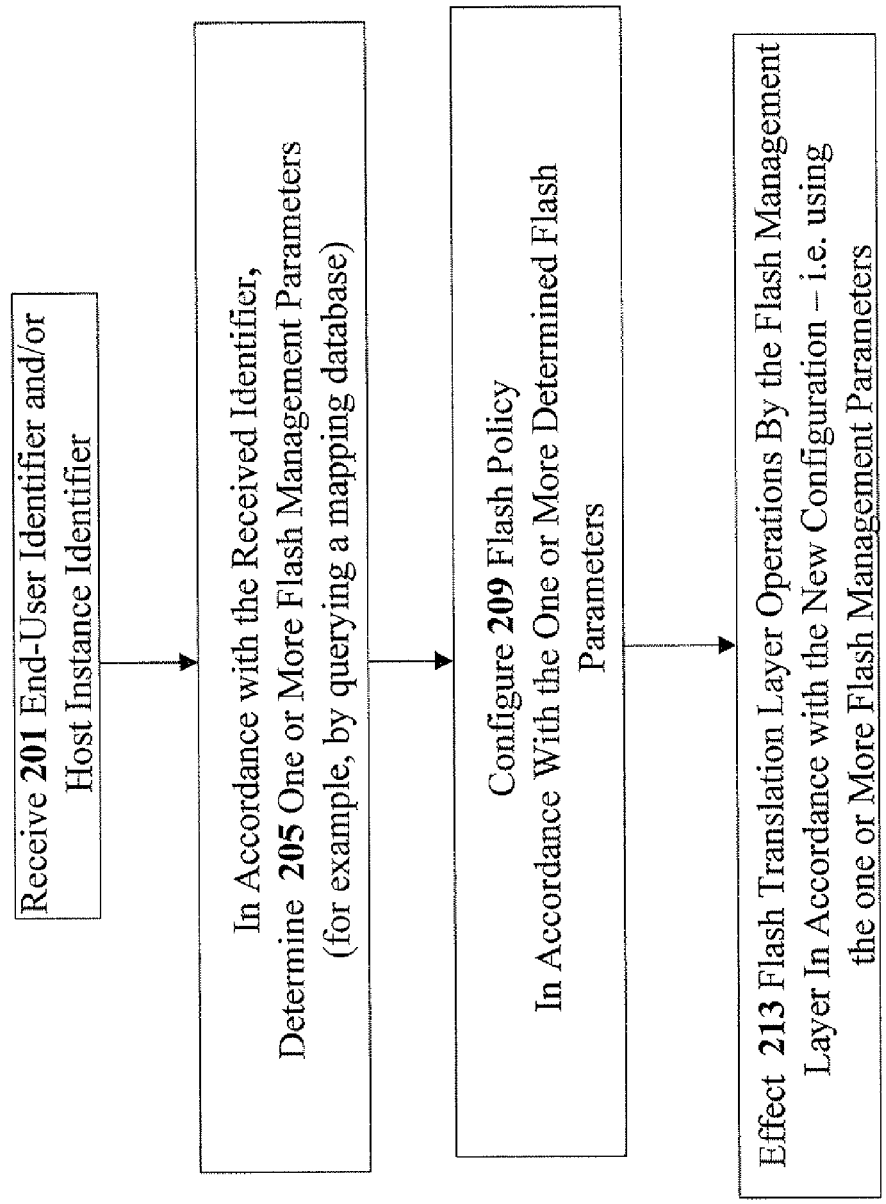
FIG. 3 is a flow chart describing an exemplary technique for configuring flash memory access behavior.

An Exemplary Technique for Configuring Flash Memory Access Behavior In Accordance With a Received End User and/or Host-Instance Identifier FIG. 3 is a flow chart describing an exemplary technique for configuring flash memory access behavior.

In step 201, the end user and/or host-instance identifier is received. In step 205, one or more "flash management parameters" are determined in accordance with the identifier received at step 201. In one non-limiting example, the 'determining' at step 205 includes looking-up in a mapping database that can be, for example, a two-column mapping 'database', where the 'searched-data' column includes a list of various end-user and/or host-instance identifiers, and the 'retrieved-data' column includes one or more 'flash parameters' or one or more descriptions of flash policies to be implemented. Each 'identifier' is thus associated with a respective "one or more parameters/policy descriptions'.

Non-limiting examples of 'flash parameters' include: (i) an error correction level for flash-read data, (ii) a "frequency" parameter for flash system tables (e.g. a parameter describing how frequently flash system tables are to be saved from RAM to flash memory—this relates to the "tradeoff" between robustness against power failure and speed), and/or a wear-leveling parameters (for example, a boolean parameter describing whether or not to carry out wear-leveling operations, which may provide slower service but increase the endurance of the flash memory) and/or a bad-block parameter (for example, a threshold parameter describing how "reliable" a block must be to be considered usable and not a 'bad block') and/or a "flash programming parameter" (for example, the size of a programming pulse, or the frequency at which programming pulses are applied when programming flash).

The mapping database may be implemented in any combination of volatile and/or non-volatile memory, and may reside on a single device or on multiple devices.

In step 209, a flash policy (e.g. flash error-correction policy, wear-leveling policy, or flash table 'housekeeping' policy for storing flash system tables from RAM to flash or bad-block policy or flash-programming parameter policy—i.e. selecting a flash programming parameter such as a programming step voltage), which is configured according to flash management parameter(s) that are determined at step 205, is enforced—for example, by modifying a data structure (or by issuing a directive or a command which causes the data structure to be modified) which stores a relevant "flash parameter".

A Discussion of ID Managers and ID Tokens

As noted above, in step 201 an identifier is received, and later a flash policy is determined and enforced in accordance with the received identifier. Optionally, an "ID manager" for delivering trusted identity tokens (end user ID, host instance ID) is provided. This may be necessary, for example, in cases where IDs need to be ascertained—for example, where a business agreement is signed between a flash vendor and an Identity Provider (e.g. for example, a software vendor or operating system vendor), to provide specific flash tradeoffs.

In one example, end-users identities are managed by an Identity Provider (IdP, a server residing in the network). In this case, the ID manager may be responsible for obtaining and storing ID tokens, signed by the IdP and corresponding to a user's ID (or device 'host instance' ID). In addition to the end-user (for example, an email address or a user login ID, or any other end-user identifier) or host device instance identifier (for example, an IMEI), a security token may also include "authentication context data"—e.g. strength of the authentication (e.g. login/password vs. smartcard or biometric authentication etc. . . . date of the authentication, identity provider information etc.

In different examples, an ID token (i.e. for an end-user identifier or host instance identifier) may be acquired 'on-the-fly' (for example, in a response to an authentication request) or 'cached' locally.

In some embodiments, the ID token is encoded according to the end user identifier and/or authentication context data—for example, strength of the authentication (e.g. login/password vs. smartcard authentication etc.), date of the authentication, and identity provider information. In one or more of these embodiments, the determination and/or enforcement of the given flash policy (i.e. error-correction policy and/or wear-leveling policy and/or bad-block policy and/or flash programming parameter policy) is contingent on the 'authentication context data'—i.e. the authentication context data must be "satisfactory" (for example, having a minimum authentication strength, a relatively recent authentication data, or an identity provider matching a pre-determined 'acceptable' list of identity providers).

In one non-limiting example, the identifier-dependent, or identifier-based, flash policy is only enforced for a given identifier if the security-token (i.e. indicating end user and/or host instance identifier) received in step 201 has a 'date of authentication' that is more recent than a certain date (for example, within the last 7 days).

In another non-limiting example, the identifier-dependent flash policy is only enforced for a given identifier if the security-token (i.e. indicating end user and/or host instance identifier) received in step 201 indicates verification by a given 'identity provider' (i.e. vendor or server).

In yet another non-limiting example, the identifier-dependent flash policy is only enforced for a given identifier if the 'strength of authentication' for the received 201 security token is of a minimum level (for example, at least smart-card level).

A Discussion of Various Architectures for Enforcing Identity-Based Flash Policies Flash Policy Enforcement in or by the File System In different embodiments, the enforcement of identity-based flash policies may be carried out at one or more 'locations' within a flash storage system. Some non-limiting examples are described in FIGS. 4A-4B, 5A-5B, and 6A-6C.

Figure 4A:
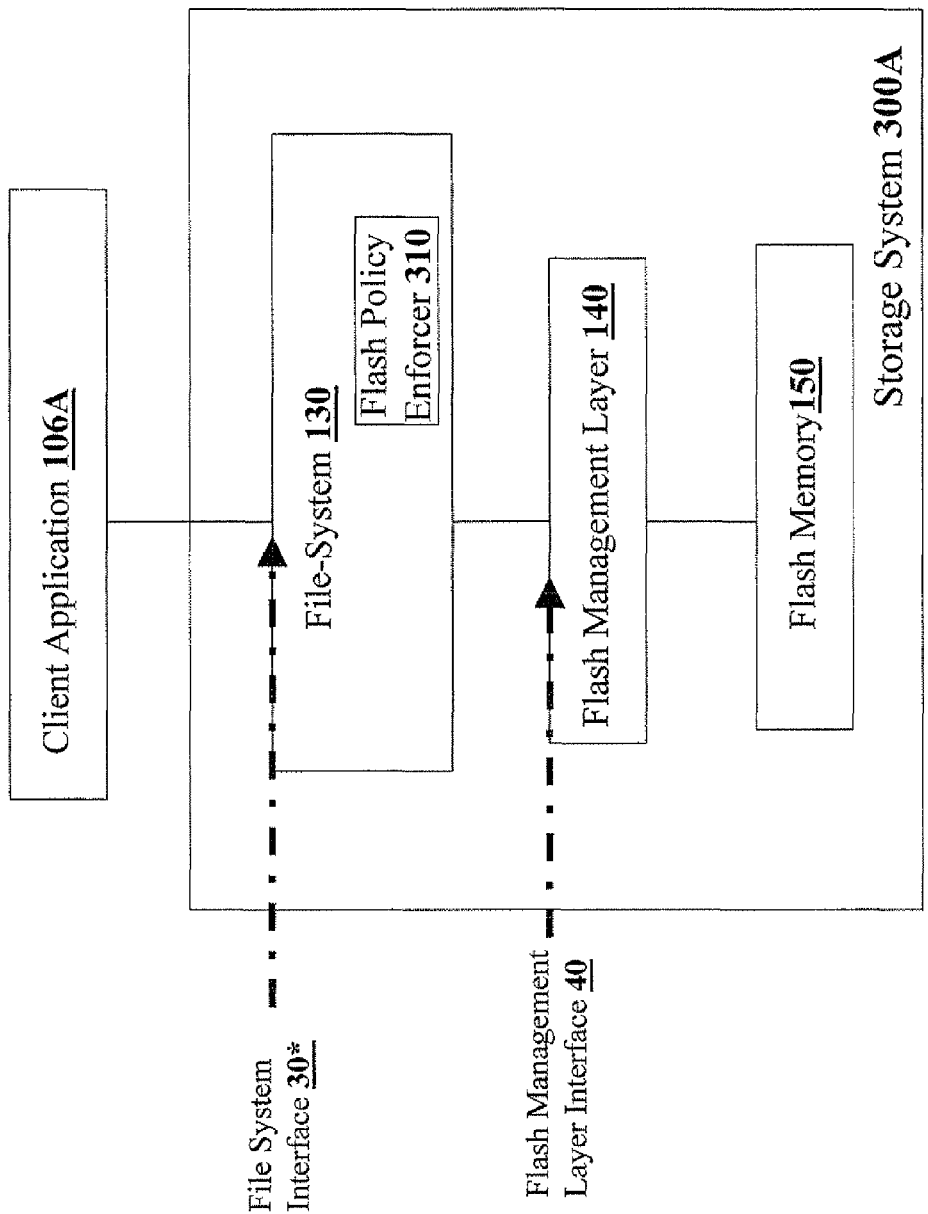
FIGS. 4A-4B, 5A-5B, and 6A-6C are block diagrams of exemplary flash storage systems operative to enforce identity-based flash policies.
Figure 6A:
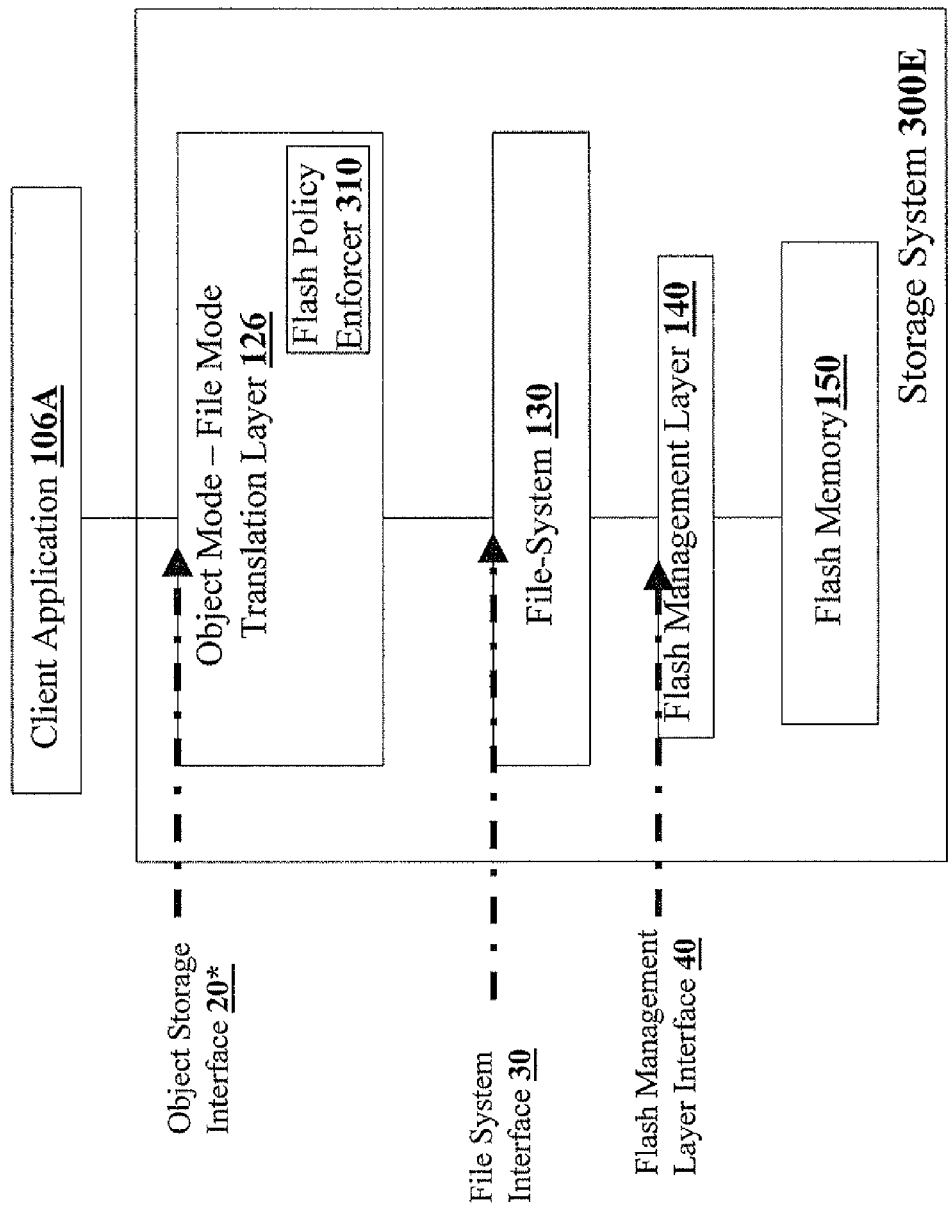
Figure 6B:
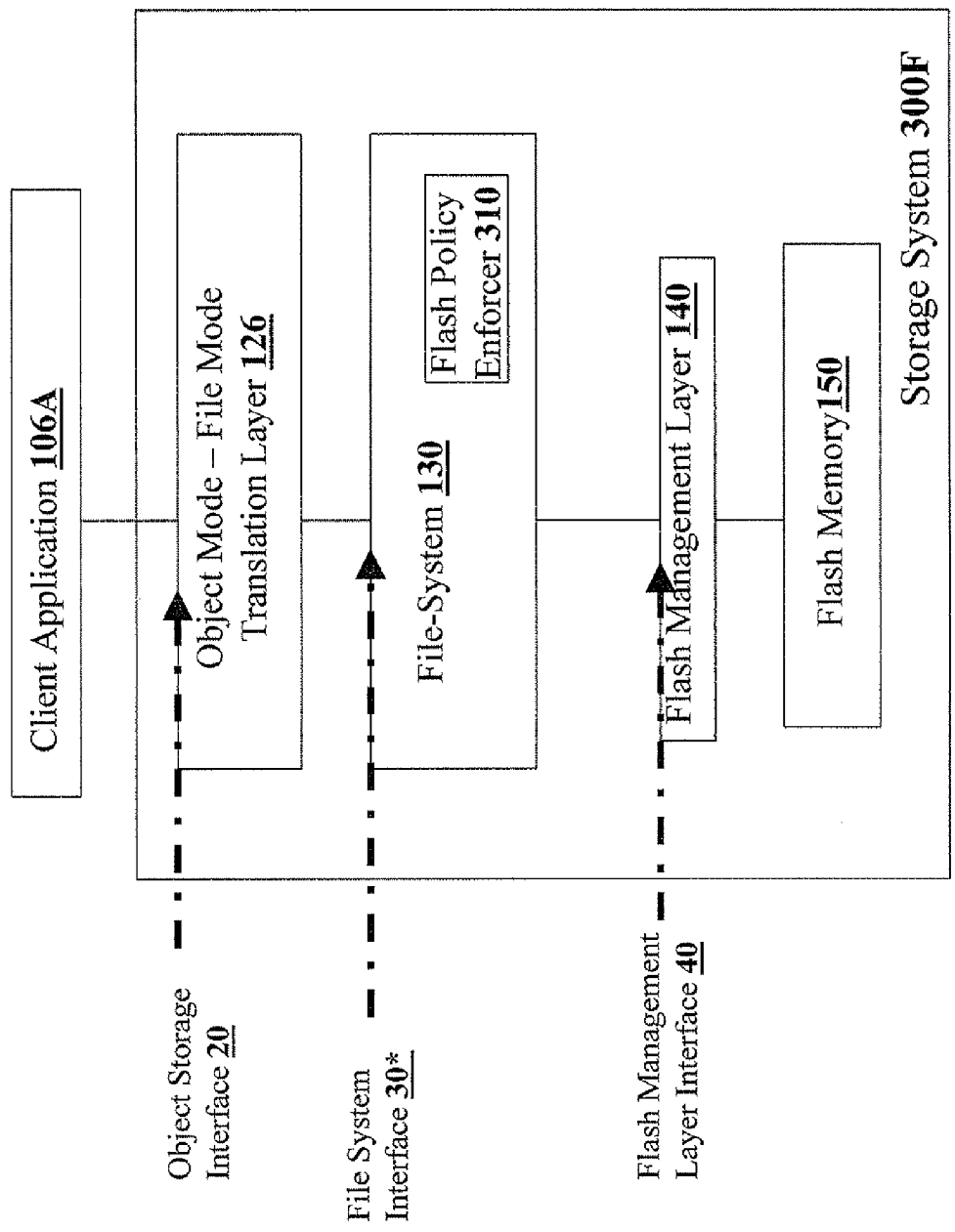

With reference to FIGS. 4A and 6B, the identifier (i.e. end-user identifier and/or host instance identifier) is received by file-system 130 (for example, from client application 106A or in any other manner), and the flash policy enforcer 310 for "enforcing the identity-dependent flash policy" resides in file system 130. In the non-limiting examples of FIG. 4A and 6B, the "interface" 30 by which flash policy enforcer receives the identifier at step 201 (i.e. end-user identifier and/or host instance identifier) is 'file-system interface' 30 which is configured as a 'multi-purpose interface. In these example, the multi-purpose file system interface 30 receives both (i) data handling requests for writing and/or writing data (in this example file handling requests) as well as (ii) identifier data (as in step 201).

For the present disclosure, the term "interface for receiving an identifier" (for example, file system interface 30 or object storage interface 20 or flash management layer interface 40) refers to a logical interface, and is not required to be a physical interface (for example, between two separate devices).

In the examples of FIGS. 4A and 6B, upon receiving the identifier, flash policy enforcer 310 effects a query of a mapping database (not shown) to obtain a description of, or any relevant data or information relating to or associated with, the flash policy to be enforced. In the examples of FIGS. 4A and 6B, the flash management layer 140 is "ignorant" of the identify-based flash policy enforcement. Nevertheless, the flash management layer provides an API (Application Programming Interface) for the policy description (for example, for receiving, one or more 'flash policy parameters'). For example, the 'flash management layer' may be configured to receive a parameter describing a level of error correction and/or a frequency at which flash system tables should be saved from RAM to flash and/or a wear leveling policy and/or a bad-block management policy and/or a flash programming parameter (for example, a programming pulse size or programming voltage frequency (i.e. frequency at which the various pulses are to be applied)).

In the example of FIGS. 4A and 6B, flash policy enforcer 310 thus: (i) receives, at step 201, the client identifier (for example, via the 'file system interface' 30); (ii) determines, at step 205, one or more flash management parameters (for example, by effecting a look-up of a mapping database (not shown)); and (iii) configures, at step 209, the flash policy—for example, by sending a 'flash policy parameter' from the file-system 130 to flash management layer 140 (for example, via a flash management layer API of the flash management layer interface 40), thereby issuing a "file-system—flash management layer directive").

For the present disclosure, a "file system—flash management directive" is a request sent from file-system 130 to the flash management layer 140 to carry one or more operations—i.e. in this case, to configure a flash policy according to one or more parameters sent from the file system to the flash management later.

In the non-limiting example of FIGS. 4A and 6B, there is no need for the flash management layer 140 to be 'aware' of 'identity-dependent flash policies' or to receive any identifier (i.e. end user identifier or host instance identifier). In this example, 'enforcement' is carried out in the file system 130, and file-system-residing flash policy enforcer 310 may configure flash management layer 140 by sending a "generic" directive (i.e. without mention of the identifier) via flash management layer interface 40.

A word on notation: In FIGS. 4A and 6B file system interface 30 is asterisked because the end-user and/or host instance identifier is passed via file system interface 30. On the other hand, flash management layer interface 40 is not asterisked because, in the non-limiting example of FIGS. 4A and 6B, the "identifier" is not passed via flash management layer interface 40. This 'asterisk' convention is also followed in other figures.

Similarly, in the non-limiting example of FIG. 6B, flash policy enforcer 310 resides in the file system 130, and policy enforcement (i.e. obtaining a description of the flash policy to be enforced and generating a directive to enforce the described flash policy) is carried out in file system 130.

Figure 4B:
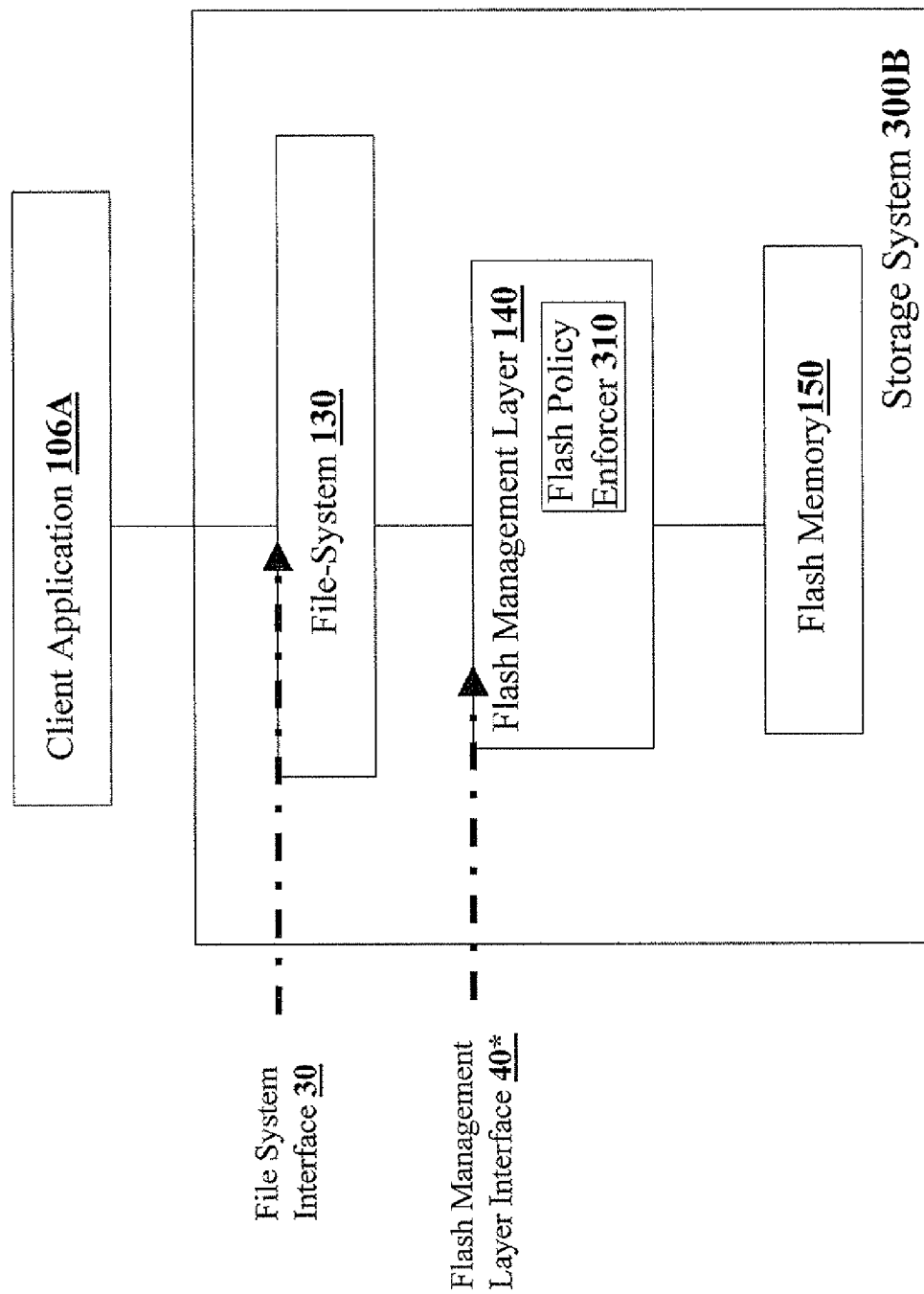
Figure 5A:
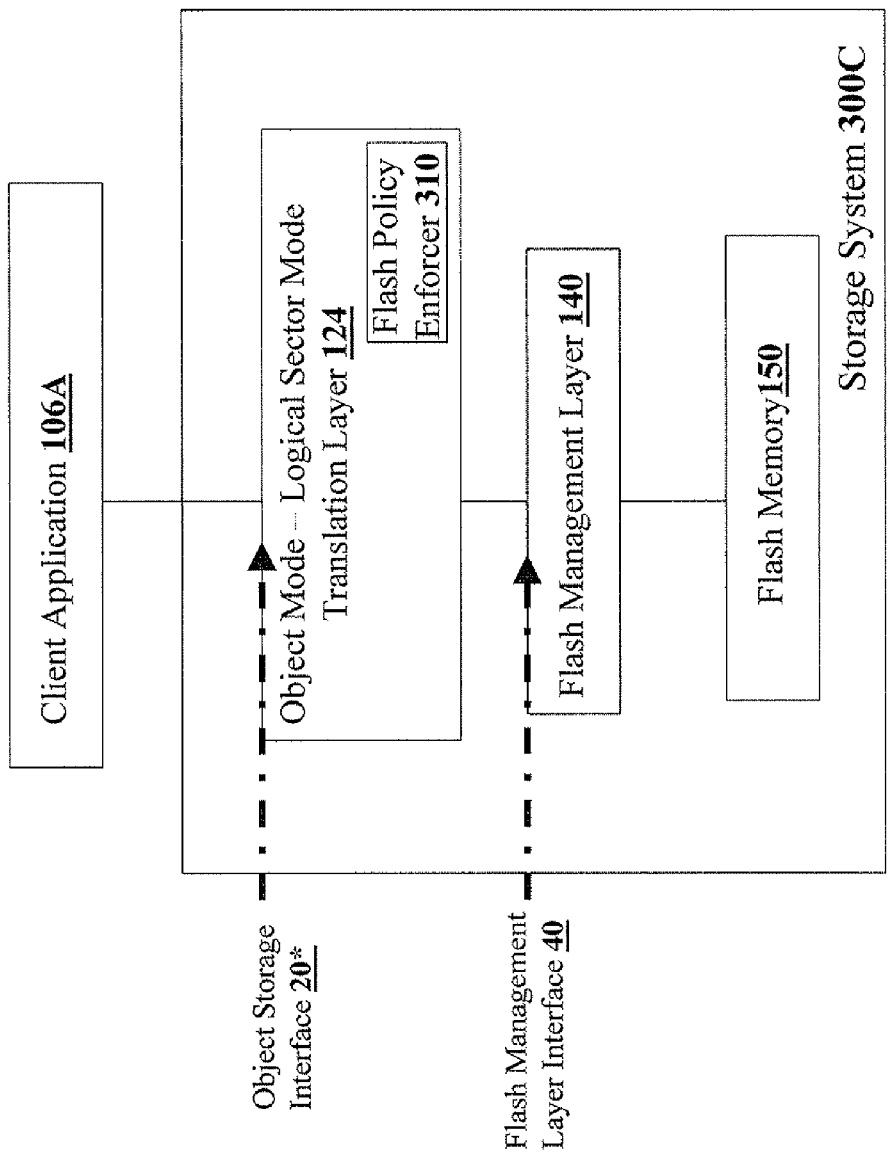
Figure 5B:
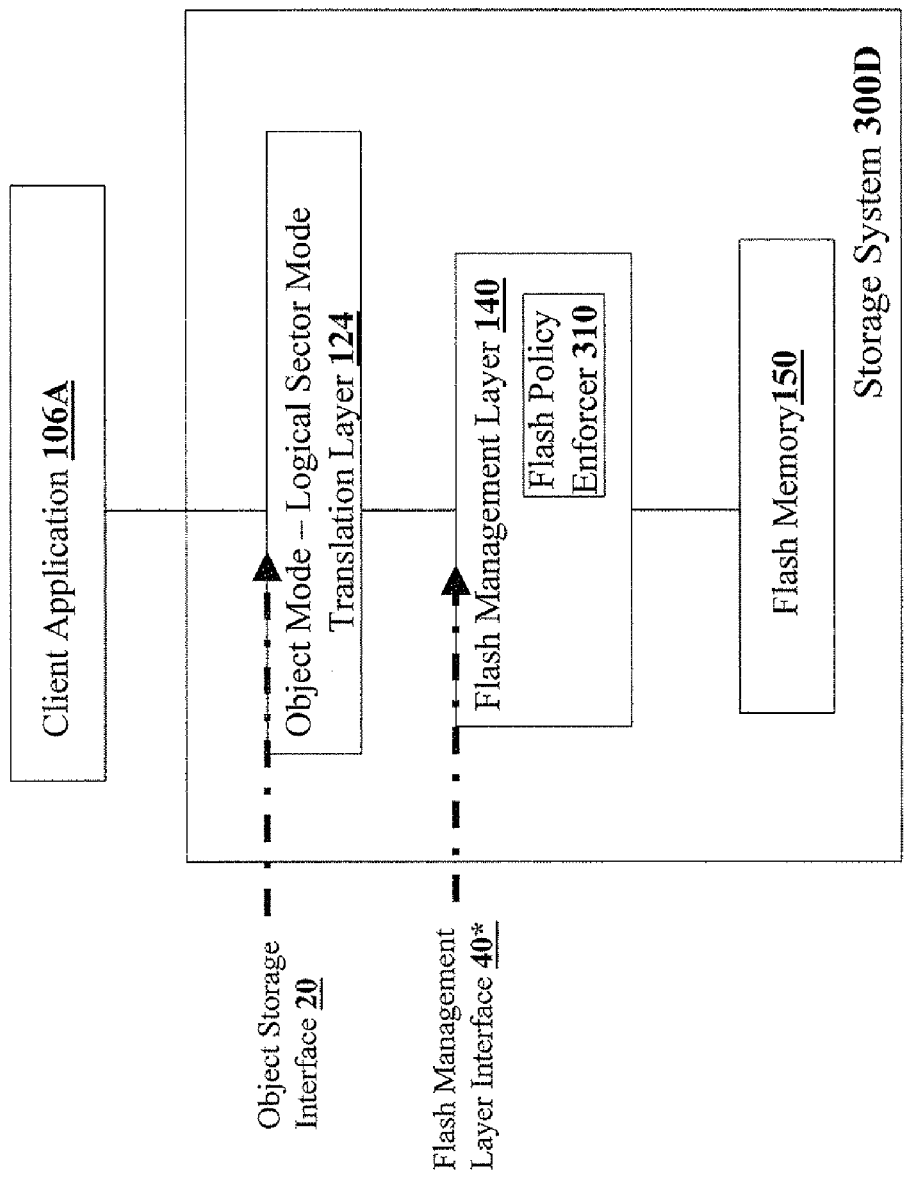
Figure 6C:
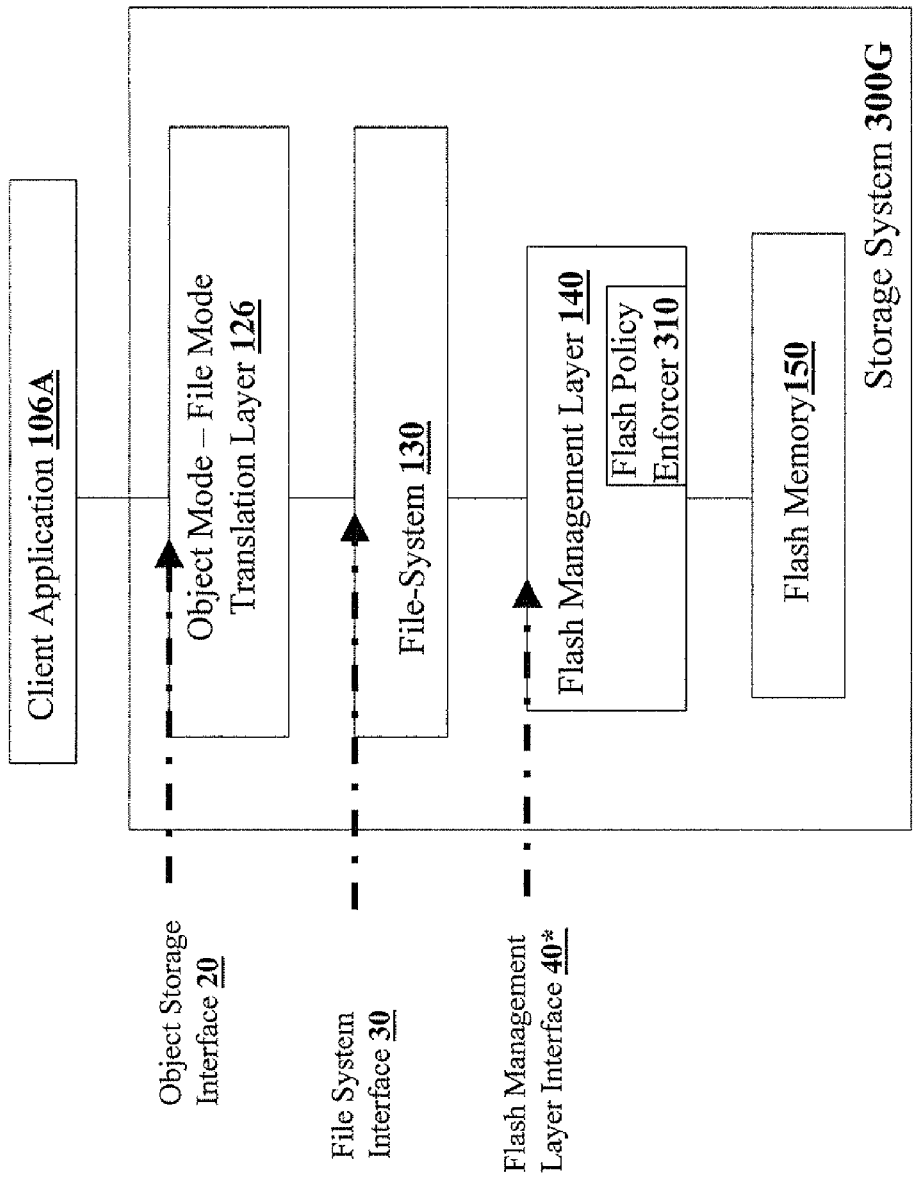

In the non-limiting examples of FIGS. 4B, 5B and 6C, flash policy enforcer 310 resides in the flash management layer 140, and policy enforcement (i.e. obtaining a description of the flash policy to be enforced and generating a directive to enforce the described flash policy) is carried out in flash management layer 140. In examples where the policy enforcement is carried out exclusively within flash management layer 140 (without invoking services from "higher levels"), it may be said that an "intra-flash management layer directive" is generated by policy enforcer 310—i.e. without any need for an explicit flash policy configuration directive (i.e. a request to configure flash policy) to be sent, to flash management layer 140, from a "higher layer"—for example, file system 130, or translation layers 124 or 126.

In contrast with the examples of FIGS. 4A and 5B, in the non-limiting examples of FIGS. 4B, 5B and 6C, the end user and/or host instance identifier is received into flash management layer 140.

In the non-limiting example of FIG. 5A, flash policy enforcer 310 resides in object mode—logical sector mode translation layer 124, and policy enforcement (i.e. obtaining a description of the flash policy to be enforced and generating a directive to enforce the described flash policy) is carried out in object mode—logical sector mode translation layer 124. In the non-limiting example of FIG. 5A, the end user and/or host instance identifier is thus received into object mode—logical sector mode translation layer 124 via object-oriented storage interface 20. Similar to the example of FIGS. 4A and 6B, and in contrast with the examples 4B, 5B and 6C, there is no need to provide the identifier (i.e. end user and/or host instance identifier) to flash management layer 140.

In the non-limiting example of FIG. 6A, flash policy enforcer 310 resides in object mode—file mode translation layer 126, and policy enforcement (i.e. obtaining a description of the flash policy to be enforced and generating a directive to enforce the described flash policy) is carried out in object mode—file mode translation layer 126. In the non-limiting example of FIG. 6A, the end user and/or host instance identifier is thus received into object mode—file mode translation layer 126 via object-oriented storage interface 20. Similar to the example of FIGS. 4A, 5A and 6B, and in contrast with the examples 4B, 5B and 6C, there is no need to provide the identifier (i.e. end user and/or host instance identifier) to flash management layer 140. Furthermore, there is no need to provide the identifier (i.e. end user and/or host instance identifier) to file system 130.

Multi-Function Interfaces

In the non-limiting example of FIGS. 4A and 6B, file system interface 30 is a "multi-purpose" or "multi-function" interface serving at least two fanctions: receiving of "ordinary" file system commands to read and/or write files, and receiving of the end user and/or host instance identifier. It is noted that the commands to read and/or write files are examples of "data handling requests" to read and/or write data—ultimately from flash memory 150 though this is not required to appear explicitly in the request. Nevertheless, there is no explicit requirement that the "identifier" be received via such a "multi-purpose interface".

Similarly, in the non-limiting example of FIGS. 4B, 5B and 6C, flash management layer interface 40 is a "multi-purpose" interface serving at least two functions: receiving "ordinary" flash manager layer commands (for example, to read or write data to a given block or page), and receiving the end user and/or host instance identifier. It is noted that the commands to read and/or write blocks or pages are examples of "data handling requests" to read and/or write data—ultimately from flash memory 150 though this is not required to appear explicitly in the request. Nevertheless, there is no explicit requirement that the "identifier" be received via such "multi-purpose interface".

Similarly, in the non-limiting example of FIGS. 4C, 5A and 6A, object-oriented storage interface 20 is a "multi-purpose" interface serving at least two functions: receiving "ordinary" object storage commands (for example, to read or write data to a given object; for example, encoded according to an object storage protocol such as MTP or OSD), and receiving the end user and/or host instance identifier. It is noted that the commands to read and/or write objects are examples of "data handling requests" to read and/or write data—ultimately from flash memory 150 though this is not required to appear explicitly in the request. Nevertheless, there is no explicit requirement that the "identifier" be received via such a "multi-purpose interface".

A Discussion of Exemplary Deployment of Components Described in FIGS. 4-6

In some implementations, every component in the aforementioned storage systems of FIGS. 4A-4B, 5A-5C, and 6A-6C resides on a single device. In some implementations, the architecture depicted in FIG. 2 is adopted where flash device 182 (i.e. including flash memory 150) (i) is coupled to host device 180 via a "physical inter-device interface" 184 (ii) effect "inter-device communications" via physical inter-device interface 184 using some asymmetric protocol with a "host-side" and a "device-side" (for example, a USB protocol or MC protocol). In addition, flash device 182 (iii) receives data from the host device 180 via physical interface 184 and stores the received to the flash memory 150 within the flash device 182; (iv) retrieves data from flash memory 150 within the flash device 182 and sends the retrieved data to the host-device 180 via physical interface.

With reference to the figures, it is noted that any component (i.e. for example, a "data handling component," for example, in any "layer" between the client application 106 and flash 150) of any storage system 300A-300G (for example, components 124, 126, 130, 140, 310) may reside in part or wholly or in part on either or host device 180 and flash device 182. Furthermore, in some embodiments, any one of the aforementioned components may be implemented in any combination of software, hardware and firmware.

In one non-limiting example, flash policy enforcer 310 is implemented partly or entirely by a controller of flash device 182. Alternatively or additionally, in another non-limiting example, flash policy enforcer 310 is implemented partly or entirely by executing driver code, for example, using a CPU of host device 180.

In the description and claims of the present application, each of the verbs, "comprise" "include" and "have", and conjugates thereof, are used to indicate that the object or objects of the verb are not necessarily a complete listing of members, components, elements or parts of the subject or subjects of the verb.

All references cited herein are incorporated by reference in their entirety. Citation of a reference does not constitute an admission that the reference is prior art. The articles "a" and "an" are used herein to refer to one or to more than one (i.e., to at least one) of the gramnmatical object of the article. By way of example, "an element" means one element or more than one element.

The term "including" is used herein to mean, and is used interchangeably with, the phrase "including but not limited" to.

The term "or" is used herein to mean, and is used interchangeably with, the term "and/or," unless context clearly indicates otherwise.

The term "such as" is used herein to mean, and is used interchangeably, with the phrase "such as but not limited to".

The present invention has been described using detailed descriptions of embodiments thereof that are provided by way of example and are not intended to limit the scope of the invention. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons of the art.

What is claimed is:

1. A system for configuring flash memory access behavior, the system comprising:
   a) an interface for receiving at least one identifier selected from the group consisting of a host-instance identifier and an end-user identifier; and
   b) a flash policy enforcer operative to effect, in accordance with at least one said received identifier that is selected from said group, at least one flash configuration operation selected from the group consisting of:
      i) a configuration of a flash error-correction policy;
      ii) a configuration of a flash-management table storage policy;
      iii) a configuration of a wear-leveling policy;
      iv) a configuration of a bad-block-management policy; and
      v) a configuration of at least one flash-programming voltage parameter.

2. The system of claim 1 wherein said flash policy enforcer is operative to effect said configuration of said flash error-correction policy.

3. The system of claim 1 wherein said flash policy enforcer is operative to effect said configuration of said flash-management layer table storage policy.

4. The system of claim 1 wherein said flash policy enforcer is operative to effect said configuration of said wear-leveling policy.

5. The system of claim 1 wherein said flash policy enforcer is operative to effect said configuration of said bad-block-management policy.

6. The system of claim 1 wherein said flash policy enforcer is operative to effect said configuration said at least one flash-programming voltage parameter.

7. The system of claim 1 wherein:
   i) said interface is a multi-function interface that is further operative to receive at least one data-handling request selected from the group consisting of a data-read-request and a data-write-request; and
   ii) said flash policy enforcer is operative to effect said at least one flash configuration operation for servicing said data-handling request.

8. The system of claim 1 wherein:
   i) said interface is a file-system interface; and
   ii) said flash policy enforcer is operative to effect said at least one flash configuration operation by issuing a file system—flash management layer directive.

9. The system of claim 1 wherein:
   i) said interface is a flash management layer interface; and
   ii) said flash policy enforcer is operative to effect said at least one flash configuration operation by issuing an intra-flash management layer directive.

10. The system of claim 1 wherein said interface is an object-oriented storage interface.

11. The system of claim 1 wherein said flash policy enforcer is operative to effect said at least one flash configuration operation by issuing an object translation layer—file system layer directive.

12. The system of claim 1 wherein:
    i) said interface is operative to receive said end-user identifier; and
    ii) said flash policy enforcer is operative to effect said at least one flash configuration operation in accordance with said received end-user identifier.

13. The system of claim 1 wherein:
    i) said interface is operative to receive said host-instance identifier; and
    ii) said flash policy enforcer is operative to effect said at least one flash configuration operation in accordance with said received host instance identifier.

14. The system of claim 1 wherein:
    i) said received end-user identifier is an email address; and
    ii) said flash policy enforcer is operative to effect said at least one flash configuration operation in accordance with said received email address.

15. The system of claim 1 wherein:
    i) said end-user identifier is an International Mobile Subscriber Identity (IMSI); and
    ii) said flash policy enforcer is operative to effect said at least one flash configuration operation in accordance with said International Mobile Subscriber Identity (IMSI).

16. The system of claim 1 wherein:
    i) said host-instance identifier is a telephone handset unique identifier; and
    ii) said flash policy enforcer is operative to effect said at least one flash configuration operation in accordance with said received telephone handset unique identifier.

17. The system of claim 1 further comprising:
    c) an identifier-mapping database configured to store a plurality of said identifiers such that each identifier of said plurality is associated with a respective flash management parameter set including a respective at least one flash operation parameter selected from the group consisting of:
       i) an error-correction level for said flash error-correction policy;
       ii) a frequency parameter for saving at least flash management table from volatile memory to flash memory for said flash management table storage policy;
       iii) a wear-leveling parameter for determining at least one of:
          A) whether or not wear-leveling should be carried out; and
          B) how frequently to effect wear-leveling operations;
       iv) a bad-block threshold parameter; and
       v) a flash programming parameter, wherein said flash policy enforcer is operative to:

i) obtain from said identifier-mapping database a respective matching flash management parameter set corresponding to said interface-received identifier;

ii) effect said flash-configuration operation in accordance with at least one obtained flash parameter of said matching flash parameter management set.

18. The system of claim 1 wherein said flash policy enforcer is operative to effect said at least one flash configuration operation in a manner that is contingent on authentication context data of said at least one identifier.

19. A method for configuring flash memory access behavior, the method comprising:
a) receiving at least one identifier selected from the group consisting of a host-instance identifier and an end-user identifier; and
b) effecting, in accordance with at least one said received identifier of said group, at least one flash configuration operation selected from the group consisting of:
i) configuring a flash error-correction policy;
ii) configuring a flash-management table storage policy;
iii) configuring a wear-leveling policy;
iv) configuring a bad-block-management policy; and
v) configuring at least one flash-programming parameter.

20. The method of claim 19 wherein said at least one flash configuration operation includes effecting said configuring of said flash error-correction policy in accordance with said received identifier.

21. The method of claim 19 wherein said at least one flash configuration operation includes effecting said configuring of said flash-management table storage policy in accordance with said received identifier.

22. The method of claim 19 wherein said at least one flash configuration operation includes effecting said configuring of said wear-leveling policy in accordance with said received identifier.

23. The method of claim 19 wherein said at least one flash configuration operation includes effecting said configuration of said bad-block-management policy in accordance with said received identifier.

24. The method of claim 19 wherein said at least one flash configuration operation includes effecting said configuration said at least one flash-programming voltage parameter in accordance with said received identifier.

25. The method of claim 19 wherein:
i) said identifier is received via a multi-function interface that is further operative to receive at least one data-handling request selected from the group consisting of a data-read-request and a data-write-request; and
ii) said at least one flash configuration operation includes is operative to configure a servicing of said data-handling request.

26. The method of claim 19 wherein:
i) said identifier is received via a file-system interface;
ii) said at least one flash configuration operation includes issuing a file system—flash management layer directive.

27. The method of claim 19 wherein:
i) said identifier is received via a flash management layer interface;
ii) said at least one flash configuration operation includes issuing an intra-flash management layer directive in accordance with said flash management layer interface received identifier.

28. The method of claim 19 wherein said identifier is received via an object-oriented storage interface.

29. The method of claim 28 wherein said at least one flash configuration operation includes issuing an object translation layer file system layer directive.

30. The method of claim 19 wherein:
i) said received identifier includes said end-user identifier; and
ii) said at least one flash configuration operation is carried out in accordance with said received end-user identifier.

31. The method of claim 19 wherein:
i) said received identifier includes said host instance identifier; and
ii) said at least one flash configuration operation is carried out in accordance with said received host instance identifier.

32. The method of claim 19 wherein:
i) said received end-user identifier is an International Mobile Subscriber Identity (IMSI); and
ii) said at least one flash configuration operation is carried out in accordance with said International Mobile Subscriber Identity (IMSI).

33. The method of claim 19 wherein:
i) said host-instance identifier is a telephone handset unique identifier; and
ii) said at least one flash configuration operation is carried out in accordance with said received telephone handset unique identifier.

34. The method of claim 19 further comprising:
c) obtaining a respective matching flash management parameter set corresponding to said interface-received identifier from an identifier-mapping database that stores a plurality of said identifiers such that each identifier of said plurality is associated with a respective flash management parameter set including a respective at least one flash operation parameter selected from the group consisting of:
i) an error-correction level for said flash error-correction policy;
ii) a frequency parameter for saving at least flash management table from volatile memory to flash memory for said flash management table storage policy;
iii) a wear-leveling parameter for determining at least one of:
A) whether or not wear-leveling should be carried out;
B) how frequently to effect wear-leveling operations;
iv) a bad-block threshold parameter; and
v) a flash programming voltage parameter, wherein said flash configuration operation is effected in accordance with at least one obtained flash parameter of said matching flash parameter management set.

35. The method of claim 19 wherein said at least one flash configuration operation is effected in a manner that is contingent on authentication context data of said at least one identifier.

36. A computer readable storage medium comprising program instructions, wherein when executed the program instructions are operable to:
a) receive at least one identifier selected from the group consisting of a host-instance identifier and an end-user identifier; and
b) effect, in accordance with at least one said received identifier selected from said group, at least one flash configuration operation selected from the group consisting of:
i) configuring a flash error-correction policy;
ii) configuring a flash-management layer storage policy;
iii) configuring a wear-leveling policy;
iv) configuring a bad-block-management policy; and
v) configuring at least one flash-programming parameter.

* * * * *